United States Patent
Wetzig

(10) Patent No.: US 11,199,467 B2
(45) Date of Patent: Dec. 14, 2021

(54) DEVICE AND METHOD FOR DISTINGUISHING A TEST GAS ESCAPING FROM A LEAK FROM INTERFERING GAS

(71) Applicant: INFICON GmbH, Cologne (DE)

(72) Inventor: Daniel Wetzig, Cologne (DE)

(73) Assignee: INFICON GmbH, Cologne (DE)

( * ) Notice: Subject to any disclaimer, the term of this patent is extended or adjusted under 35 U.S.C. 154(b) by 0 days.

(21) Appl. No.: 16/651,021

(22) PCT Filed: Sep. 28, 2018

(86) PCT No.: PCT/EP2018/076401
§ 371 (c)(1),
(2) Date: Mar. 26, 2020

(87) PCT Pub. No.: WO2019/063761
PCT Pub. Date: Apr. 4, 2019

(65) Prior Publication Data
US 2020/0271540 A1 Aug. 27, 2020

(30) Foreign Application Priority Data
Sep. 29, 2017 (DE) .......................... 102017217374.2

(51) Int. Cl.
*G01M 3/22* (2006.01)
*G01M 3/20* (2006.01)
(52) U.S. Cl.
CPC ............ *G01M 3/222* (2013.01); *G01M 3/205* (2013.01)
(58) Field of Classification Search
None
See application file for complete search history.

(56) References Cited

U.S. PATENT DOCUMENTS 5,469,732 A * 11/1995 Voss ................... G01N 33/0016
73/24.04
2008/0202210 A1 * 8/2008 Liepert ................. G01M 3/007
73/40

FOREIGN PATENT DOCUMENTS

DE 102010007417 8/2011
EP 1555520 7/2005
(Continued)

*Primary Examiner* — Paul M. West
*Assistant Examiner* — Mark A Shabman
(74) *Attorney, Agent, or Firm* — Kirton McConkie; Whitney Blair; Craig Metcalf

(57) ABSTRACT

A method for distinguishing a test gas escaping from a leak in a test object (21) from an interfering gas in the environment of the test object (21) during sniffing leak detection, having the steps: suctioning gas from the environment of the test object (21) in the region of the outer surface of the test object by means of a sniffing tip, which has a suction opening (14), which is connected, for gas conduction, to a sensor (18), which is designed to determine the test gas partial pressure of the test gas in the suctioned gas flow; varying, with periodic repetition, the flow intensity of the suctioned gas flow; setting a total pressure of the suctioned gas at the sensor (18) of at least 80 percent of the total pressure of the gas in the atmosphere (23) surrounding the test object (21); avoiding fluctuations of the total pressure of the suctioned gas at the sensor (18) of more than 10 percent; measuring the test gas partial pressure of test gas contained in the suctioned gas flow by means of the sensor (18); indicating that the test object (21) has a leak if the measured test gas partial pressure has a varying component, the average amplitude of which lies above a threshold value and which follows the variation of the suctioned gas flow.

11 Claims, 4 Drawing Sheets

(56) References Cited

FOREIGN PATENT DOCUMENTS

| | | |
|---|---|---|
| JP | 2001050852 | 2/2001 |
| WO | 2009/051530 | 4/2009 |

\* cited by examiner

DEVICE AND METHOD FOR DISTINGUISHING A TEST GAS ESCAPING FROM A LEAK FROM INTERFERING GAS

RELATED APPLICATIONS

This application is National Stage of International Application No. PCT/EP2018/076401, filed Sep. 28, 2018, and entitled DEVICE AND METHOD FOR DISTINGUISHING A TEST GAS ESCAPING FROM A LEAK FROM INTERFERING GAS, which claims priority to German Application No. 102017217374.2, filed Sep. 29, 2017. This application claims priority to and incorporates herein by reference the above-referenced applications in their entirety.

BACKGROUND OF INVENTION

The invention relates to a method for distinguishing a test gas escaping from a leak in a test object from interfering gas in the environment of test object during sniffing leak detection. The invention furthermore relates to a corresponding sniffing leak detector.

During sniffing leak detection, a test object to be tested for a leak is filled with a test gas, for example helium or $CO_2$, and acted upon with a pressure that is greater than the pressure in the outer atmosphere surrounding the test object. If there is a leak, the test gas then escapes from the test object and can be measured in the outer environment of the test object. To this end, the outer environment, in particular the outer surface of the test object, is tested with a sniffer.

The sniffer has a suction opening for suctioning a gas flow. The suction opening is connected via a gas line path to a sensor and a gas pump generating the gas flow. The sensor is designed for detecting the test gas partial pressure of the test gas in the suctioned gas flow.

The test gas partial pressure is the portion of the pressure of the test gas in the entire pressure of the suctioned and conveyed gas mixture. A typical test gas partial pressure sensor is a gas analyzer, such as, for example, a mass spectrometer/mass spectroscope or an infrared radiation absorption measuring cell.

When testing the environment of the test object for the presence of test gas, there is a difficulty in that the atmosphere surrounding the test object may have gas components that are the same as the test gas or that provide a measurement signal that is the same as the measurement signal of the test gas. These gas components are called interfering gas herein because they distort the measurements and interfere with leak detection. For example, the test object to be tested may be a heat exchanger that is filled with $CO_2$ as cooling agent. The $CO_2$ acts a test gas. $CO_2$ may be present in the environment of the test object in the form of breathing gas from the person operating the sniffer or as exhaust gas from an internal combustion engine. Moreover, cross-sensitivities to similar or identical gases from the environment of the test object may exist during detection of the test gas using the method of infrared absorption or using a mass spectroscopic detection.

Normally test gas escaping from a leak is differentiated from interfering gas in the environment of the test object using a sniffer having two separate suction openings. The one suction opening suctions the test gas and the other suction opening provides a reference measurement at a distance from the suction opening. The gas composition in the environment of the test object is tested for the presence of test gas. Such leak detectors are described in EP 1342070 B1 and EP 22384422 B1, for example. Due to the distance between the two suction openings for test gas detection and for reference measurement, the gas for the reference measurement is not taken up at the site of the test gas suctioning, which has a negative effect on the measurement result.

Given this background, the underlying object of the invention is to improve differentiation between a test gas escaping from a leak in a test object and interfering gas in the environment of the test object during sniffing leak detection.

For a mass spectrometer in a test gas leak indicator, known from EP 7050738 B1 and DE 4408877 A1 is modulating the gas flow through the gas inlet in order to suppress factors interfering with the vacuum pump of the mass spectrometer. The described test gas leak indicator is designed for vacuum operation and is not suitable as a sniffing leak detector for operating at atmospheric ambient pressure. The total pressure of the gas at the gas detector is proportional to the ratio of the gas flow of the conveyed gas to the suction. Thus, it is not possible to evaluate whether the measured test gas partial pressure stems from interfering gas from the environment of the test object or from test gas that has escaped from a leak in the test object. On the contrary, only interferences from the interior of the measuring system can be eliminated, such as, for example, interferences due to fluctuations in backing pump suction.

The inventive method is defined by the features of claim 1. The inventive device is defined by the features of claim 8.

The invention is based on the idea of varying, with periodic repetition, the flow intensity of the gas flow suctioned through the suction opening into the sniffer while keeping the total pressure of the gas suctioned with the sniffer as constant as possible at the sensor. Fluctuations in the total pressure of more than 10 percent are to be avoided. In addition, the total pressure of the gas in the environment of the test object in the region of the sniffer is approximately atmospheric pressure and the total pressure at the sensor should preferably be set to a value of at least 80 percent of the total pressure in the environment of the test object in the region of the sniffer. In this region, the relationship between gas flow and gas pressure is approximately linear. Given only negligible fluctuations in the total pressure at the sensor of maximum 10 percent, the relationship between the test gas partial pressure measured with the sensor and the test gas concentration in the suctioned gas flow is approximately as described in the following:

$$P_{testgas} = \left(\frac{Q_{leak}}{Q_{flow}} + c_0\right) \cdot P_{total},$$

wherein $P_{test\,gas}$ is the test gas partial pressure measured with the sensor, $P_{total}$ is the total pressure at the sensor, $Q_{leak}$ is the gas flow through the leak (leak rate), $Q_{flow}$ is the flow rate of the gas at the sensor, and $c_o$ is the test gas concentration in the atmosphere surrounding the test object (interfering gas).

When there is a negligibly small leakage gas flow, that is, test gas flow that results from a leak in the test object, the result is a nearly constant negligibly varying test gas partial pressure. Specifically, if no test gas is escaping from a leak, the test gas partial pressure results from the constant concentration of the interfering gas, which corresponds to the test gas, or at least resembles it (for example during infrared absorption), and that is present in the atmosphere surrounding the test object. However, if the test gas flow escaping from a leak in the test object is suctioned with the sniffer, a varying, with periodic repetition, flow intensity of the suctioned gas flow causes a varying, with period repetition, component of the test gas partial pressure at the sensor.

To determine whether test gas is escaping from a leak in the test object or comes from the atmosphere surrounding the test object, the suctioned gas flow is thus tested to determine whether the measured test gas partial pressure has a varying component, the mean amplitude of which is greater than a threshold value, that is, is not negligible, and follows the variation of the suctioned gas flow, that is, for example, that the frequency of the varying test gas partial pressure component corresponds to the frequency of the varying flow intensity of the suctioned gas flow. If a varying test gas partial pressure component is greater than the threshold value, this is an indication of a leak in the test object. The evaluation device then indicates that the test object has a leak. If no varying test gas partial pressure component is found, or if a varying test gas partial pressure component is less than a measured threshold, this is an indication that the test object does not have a leak, but instead that the test gas comes from the atmosphere surrounding the test object and is thus an interfering gas. It may then be indicated that the test object does not have a leak.

The concentration c of test gas in the suctioned gas stream for a leak rate $Q_{leak}$ and the flow rate $Q_{flow}$, where $Q_{leak} \ll Q_{flow}$, and for the test gas concentration $c_0$ present in the atmosphere surrounding the test object (interfering gas), is found with the formula $$c = \frac{Q_{leak}}{Q_{flow}}(1 - C_0) + C_0.$$

From this relationship it may be seen that $c = c_0$ if there is a negligibly low leak rate, that is, if the test object does not have a leak or has only a negligibly small leak. The test gas concentration in the suctioned gas flow is then the test gas concentration $c_0$ (caused by the interfering gas) in the atmosphere surrounding the test object.

If there is a leak rate $Q_{leak}$, a varying, with periodic repetition, flow intensity of the suctioned gas flow leads to a varying, with periodic repetition, flow rate $Q_{flow}$ (t). An alternating component that varies periodically with the flow rate and a constant component corresponding to the test gas concentration $c_0$ in the atmosphere surrounding the test object then results for the test gas concentration.

Taking into consideration the relationship $p_{test} = c \cdot p_{total}$, the sensor determining the test gas partial pressure of the test gas measures a test gas partial pressure that has a constant component $c_0 \cdot p_{total}$ and a varying component $$\frac{Q_{leak}}{Q_{flow}}(t) \cdot p_{total}$$

that varies with the flow rate of the suctioned gas flow.

From this it may be seen that a total pressure $p_{total}(t)$ of the suctioned gas flow at the sensor that is as constant as possible is of considerable significance for the invention, because a nearly constant test gas component, that is, a test gas component, the fluctuation of which is less than a predefined threshold value, results only if there is no leak or a negligibly small leak in the test object.

The threshold value is determined according to a calibration to be performed separately. The smallest detectable leak should cause a change in partial pressure that is higher than the unavoidable partial pressure fluctuation from the test gas concentration in the surrounding atmosphere.

The total pressure $p_{total}$ of the suctioned gas flow at the sensor should preferably be in the range between 90 and 110 percent of the total pressure in the atmosphere surrounding the test object in the region of the sniffer. This may be atmospheric pressure, that is, the test object is exposed to the atmosphere and in its interior has a pressure that is greater than atmospheric pressure, while at the sensor of the sniffing leak detector a total pressure is maintained in the range of 90 to 110 percent of the atmospheric pressure, which should also have negligible fluctuations, that is, should vary less than 10 percent.

The measurement signal of the flow intensity of the suctioned gas flow can be modulated with a modulation frequency and modulation phase. The modulated flow intensity signal can be demodulated according to the principle of a lock-in amplifier with a defined frequency reference and phase reference to the modulation of the flow intensity signal. Frequency reference and phase reference means that the demodulation frequency and demodulation phase is a multiple of the frequency and phase of the modulation.

An additional comparison measurement can take place in which the flow intensity of the suctioned gas flow is not varied periodically, but instead is kept constant, in order to be able to determine the test gas partial pressure in the atmosphere surrounding the test object. The modulation frequency for modulating the flow intensity of the suctioned gas flow is preferably in the range of 1 Hz-20 Hz and preferably in the range of 3 Hz-10 Hz.

In the inventive sniffing leak detector, a gas conducting path, which may be a gas line, connects the suction opening of the sniffer, the sensor, and a gas pump. The sensor is designed to determine the test gas partial pressure of the test gas to be detected in the suctioned gas flow. The gas pump generates the gas pressure required for suctioning the gas. A control device is designed to repeatedly vary the flow intensity of the suctioned gas flow and to prevent fluctuations of more than 10% in the total pressure of the gas at the sensor. An evaluation device is designed to measure and determine whether the test gas partial pressure of test gas that is contained in the suctioned gas flow has a varying component, the mean amplitude of which is greater than the aforesaid threshold and which follows the variation of the suctioned gas flow. This may be the case, for example, if the frequency of the varying component of the test gas partial pressure corresponds to the frequency of the varied gas flow and the phase is in a fixed correlation to the phase of the gas flow modulation.

The control device is preferably designed to set the total pressure of the suctioned gas flow at the sensor to a value in the range of about 80 percent, and preferably in the range between 90-110 percent, of the total pressure of the gas in the atmosphere surrounding the test object. In this range, the relationship between gas flow and gas pressure is approximately linear. In addition, the control device should be designed to determine the leak gas flow with respect to a calibration with a known test leak.\

Fluctuations in the total pressure of the gas at the sensor can be suppressed or reduced, for example, in that the sensor is arranged downstream of the gas pump. Alternatively, or in addition, the gas line path between suction opening and sensor can have a throttle. To reduce fluctuations in the gas flow, the control device can control the flow rate or speed of the gas pump and/or change to the admittance or flow resistance of the throttle. The throttle may be a capillary tube that, for example, has a length in the range of approx. 2 cm to approx. 1 m and a diameter of a maximum of approx. 5 mm. Longer capillary tubes are also possible, however.

BRIEF DESCRIPTION OF FIGURES

Exemplary embodiments of the invention shall be explained in greater detail in the following using the figures.

DETAILED DESCRIPTION OF THE INVENTION

Figure 1:
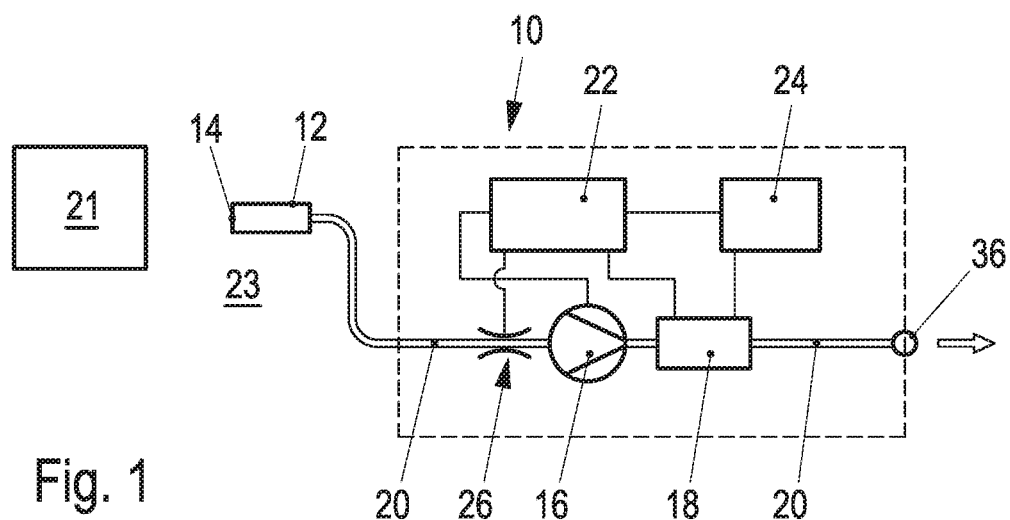
FIG. 1 is a schematic illustration of a first exemplary embodiment.
Figure 2:
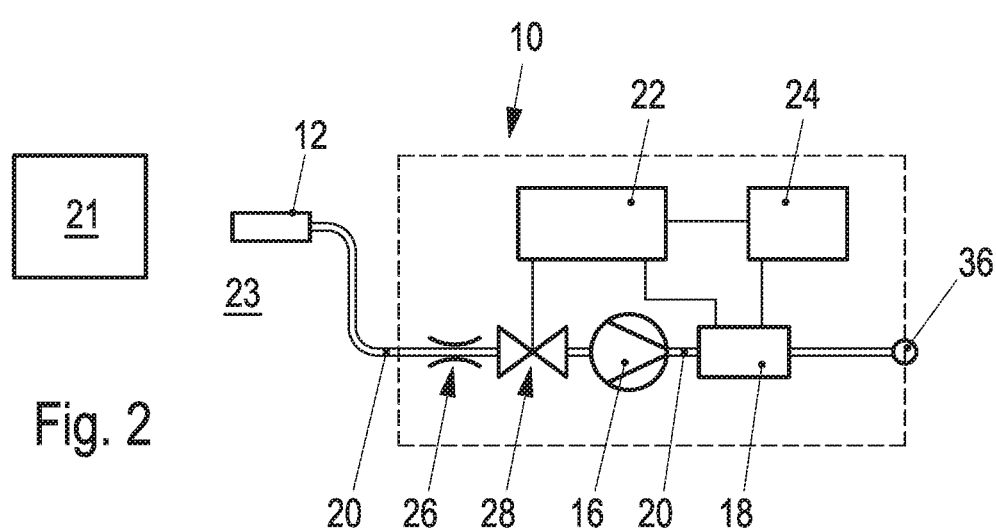
FIG. 2 is a schematic illustration of a second exemplary embodiment.
Figure 3:
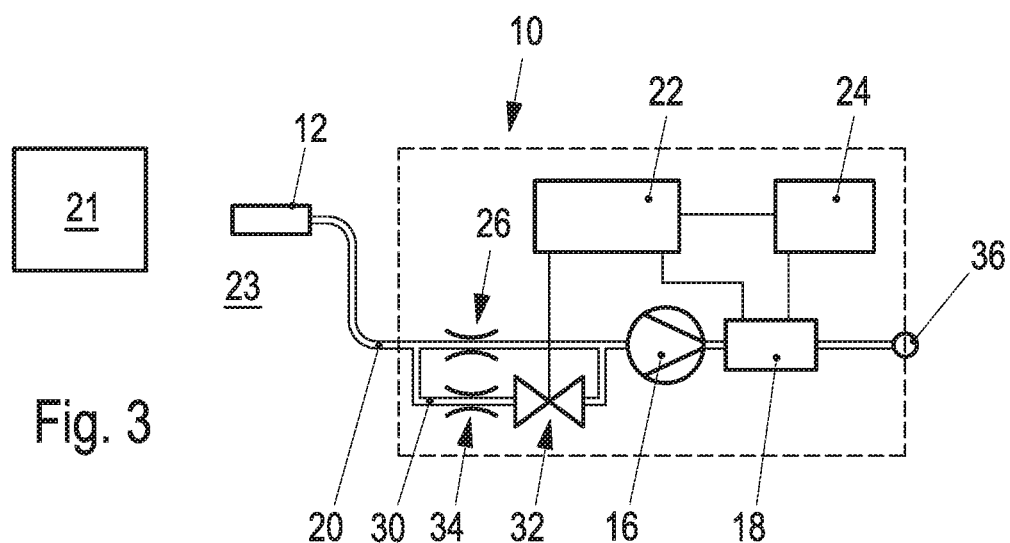
FIG. 3 is a schematic illustration of a third exemplary embodiment.

The sniffing leak detectors 10 in the three exemplary embodiments in FIGS. 1 through 3 are each connected in the conventional manner via a gas line path 20 to a sniffer 12 having a suction opening 14. Arranged along the gas line path 20 is a gas pump 16 that produces the gas pressure required for suctioning the gas from the atmosphere 23 surrounding the test object 21.

The gas line path 20, in the form of a conventional gas line, furthermore, connects the pump 16 to a sensor 18 arranged immediately downstream of the pump 16. The sensor 18 is designed for measuring the partial pressure of the test gas in the suctioned gas flow. The sensor 18 may be an infrared absorption cuvette, for example. What is important is that the sensor 18 is designed to determine the test object partial pressure at nearly atmospheric pressure or at about 90-110 percent of atmospheric pressure. The test gas partial pressure is the component of the test gas in the gas mixture of the suctioned gas flow. The partial pressure of the test gas thus cannot be measured with a pressure sensor. A pressure sensor merely measures the total pressure of a gas mixture.

Once the suctioned gas flow has flowed through the sensor 18, the gas line path 20 leads the gas flow out to the atmosphere via an outlet 36.

The gas line path 20 can have a throttle 26. As illustrated in FIG. 1, the throttle 26 can be arranged upstream of the gas pump 16. A control device 22 is electronically connected thereto for controlling the gas pump 16. For example, the control device 22 can be designed for controlling the speed of the gas pump 16. FIG. 1 illustrates that the control device 22 can also be connected to the throttle 26 in order to change the admittance of the throttle 26. In addition, the control device can also be electronically connected to the sensor 18.

An evaluation device 24 is electronically connected to the sensor 18 in order to process and evaluate the measurement signal. The evaluation device 24 is designed to determine whether the test gas partial pressure of the test gas contained in the suctioned gas flow has a varying component. The evaluation device 24 can in particular test whether the varying component of the test gas partial pressure has a mean amplitude that is greater than a threshold value. In addition, the evaluation device 24 can determine whether the varying component of the test gas partial pressure follows the variation of the suctioned gas flow. This is the case if the frequency of the varying test gas partial pressure component corresponds to the frequency of the varying gas flow or to a multiple of this frequency.

To this end, the evaluation device 24 can be connected to the control device 22. The control device 22 varies, for example, the flow intensity of the suctioned gas flow in that the pump speed is varied. This can be accomplished in the form of a modulation, for example according to the principle of the lock-in amplifier. The evaluation device 24 can perform a comparison of the frequency of a varying test gas partial pressure to the modulation frequency of the suctioned gas flow.

The evaluation device 24 is also designed to determine in the framework of a calibration, the leakage flow of a known leak with a known leak rate.

The control device 22 in the first exemplary embodiment is also designed to set the total pressure of the suctioned gas flow in the region of the sensor 18 to at least about 90-110 percent of the total pressure of the gas in the atmosphere 23 surrounding the test object 21. As will be explained in the following with reference to FIG. 5, the relationship between gas flow and gas pressure in this pressure range is approximately linear. The total pressure of the suctioned gas flow at the sensor 18 can be set by controlling the speed of the gas pump 16 and/or by controlling the admittance of the throttle 26.

The exemplary embodiments relate to sensors arranged directly downstream of the gas pump 16. With this arrangement, fluctuations in the total pressure of the gas at the sensor 18 are reduced. Alternatively, however, it is also possible to arrange the sensor 18 upstream of the gas pump 16, that, is between sniffer 12 and gas pump 16.

The exemplary embodiment in FIG. 2 is distinguished from the exemplary embodiment in FIG. 1 in that a controllable valve 28 that can be controlled via the control device 22 is provided upstream of the gas pump 16 in order to change the cross-section of the line in the gas line path 20. The controllable valve 28 is preferably arranged between the throttle 26 and the gas pump 16. By changing the cross-section of the gas line path 20 using the controllable valve 28 it is possible to change, and in particular vary, the admittance of the gas line path 20. The flow intensity of the suctioned gas flow is varied repeatedly in this way in the second embodiment.

The third exemplary embodiment is distinguished from the second exemplary embodiment in that a bypass 30 bridges the gas line path 20 between the sniffer 12 and the gas pump 16 and in particular the throttle 26. The bypass 30 is provided with a throttle 34, the admittance of which is much greater than the admittance of the throttle 26. The bypass line 30 has a controllable valve 32 that, for controlling the latter, is electronically connected to the control device 22. When the admittance of the valve 32 is increased, the gas flow in the bridged gas line path 20 is reduced. When the admittance of the valve 32 is reduced, the gas flow in the bridged gas line path 20 is increased. In this way the flow intensity of the suctioned gas flow may be varied using the control device 22 and the controlled valve 32 in the bypass line 30.

Figure 4:
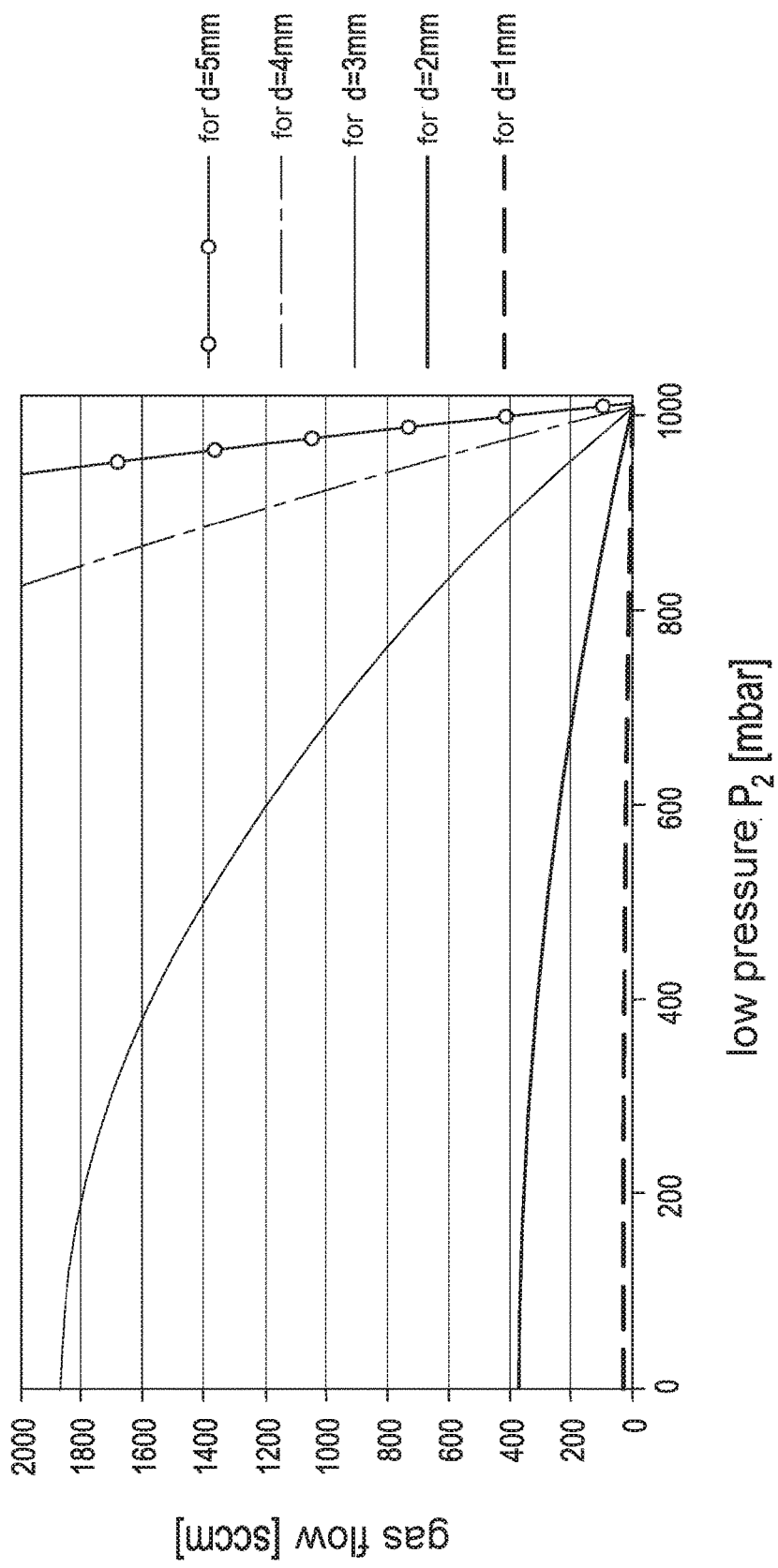
FIG. 4 illustrates the curve of the suctioned gas flow over the pressure at the sensor for various diameters of the flow path.
Figure 5:
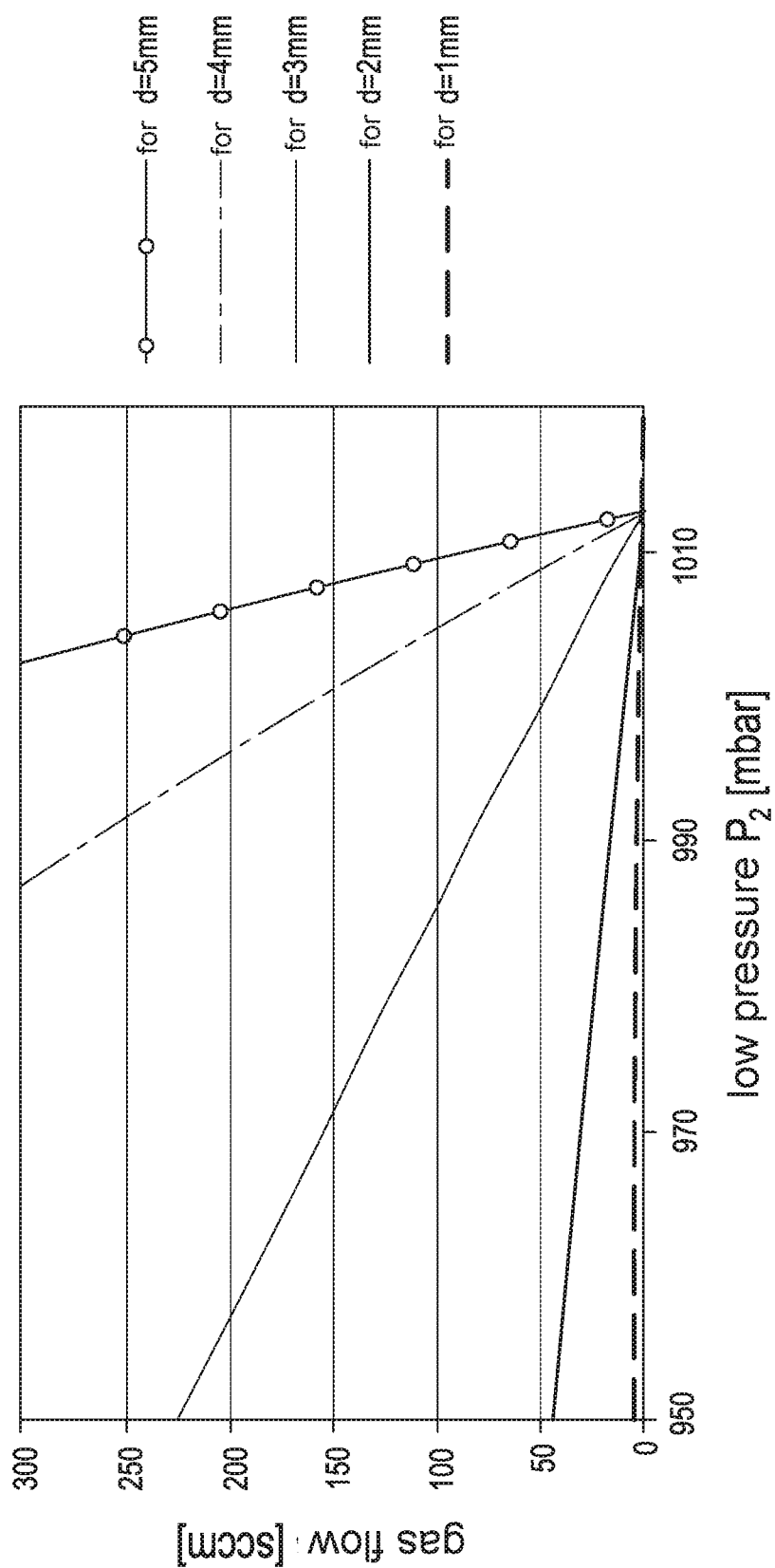
FIG. 5 is a detail from FIG. 4.

The throttle 26 may be a capillary tube having a length in the range of approx. 2 cm to approx. 10 cm and a diameter of a maximum of about 5 mm. In FIGS. 4 and 5, the resulting gas flow is plotted in sccn (standard cubic centimeters per minute, $cm^3/min$) on the vertical axis (ordinate) over the pressure in mbar (millibars) on the horizontal axis (abscissa) for various diameters of the throttle 26 embodied as a capillary tube. In the case of pressure $P_2$, plotted on the horizontal axis, the pressure $P_2$ is inside the gas line path 20 downstream of the gas pump 16 in the region of the sensor 18. The environmental pressure in the environment 23 of the test object 21 is 1013 mbar (atmospheric pressure). Atmospheric pressure shall be understood in this case to be a pressure that can be in the range of approx. 900 mbar to approx. 1100.

FIG. 4 illustrates the curve for self-setting gas flows for various diameters d of the capillary tube for the throttle 26 in the range between 0 mbar and 1000 mbar. The length of the capillary tube is 5 cm. FIG. 5 illustrates the curves according to FIG. 4 in the pressure range between 950 and 1015 mbar. It may be seen from FIG. 5 that the relationship between gas flow and gas pressure is approximately linear when the pressure is at least 950 mbar. It is therefore advantageous according to the invention when the total pressure of the suctioned gas flow at the sensor 18 is set to a value in the range between about 90% and 110% of the total pressure in the environment of the test object 21. It is basically particularly important that the total change in pressure is negligible and thus causes a major change in flow.

Due to a slight change in the low pressure at the sensor, for instance 985 mbar to 1000 mbar of a capillary length of 5 cm and a diameter of 3 mm, the flow changes by a factor 2 of 100 sccn to 50 sccn. This aspect is distinguished from the applications in the vacuum region as are described, for example, in DE 4408877 A/EP 7050738 B1. If the pressure $P_2$ at the site of the sensor 18 is very low, as is the case with vacuum leak detectors, for example, a change in pressure of, for example, 0.1 mbar to 50 mbar has only a minor effect on the gas flow.

A typical leak in the test object 21 can cause a leakage gas flow of $1 \cdot 10^4$ mbar·l/s. The flow or flow intensity of the suctioned gas flow in the range between 120 sccm and 12 sccm is modulated with a modulation frequency of 6 Hz. With the modulation frequency, the total pressure fluctuates between 1000 mbar and 950 mbar. The environmental concentration $c_0$ can be 400 ppm. The total pressure fluctuation of 50 mbar is relatively high. Nevertheless, the partial pressure fluctuation caused by the total pressure fluctuation is low and thus is negligible in comparison to the varying component of the partial pressure that results from the flow modulation. In practice, the fluctuation in the total pressure is even much lower than 50 mbar.

Figure 6:
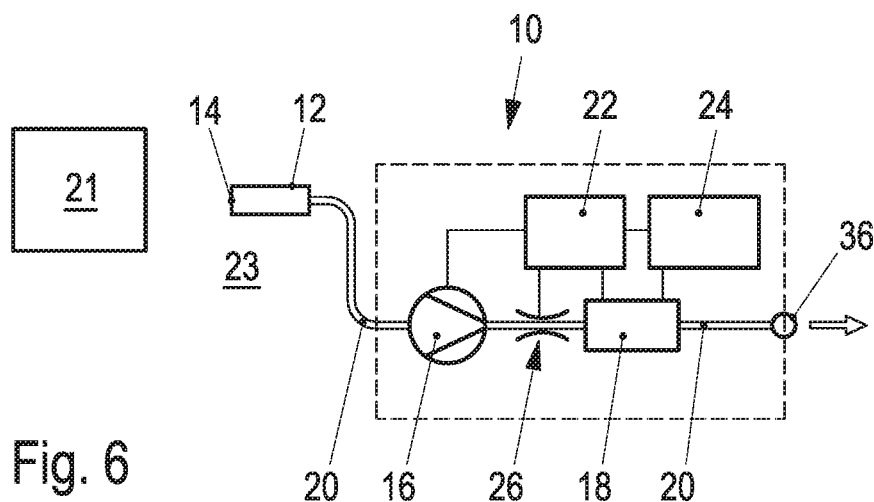
FIG. 6 illustrates a fourth exemplary embodiment.

The exemplary embodiment according to FIG. 6 is distinguished from the exemplary embodiment according to FIG. 1 in that the gas pump 16 is not arranged between the throttle 26 and the sensor 18 in the gas line path 20, but instead is arranged in the gas line path 20 between the sniffer 12 and the throttle 26, that is, upstream of the throttle 26.

Figure 7:
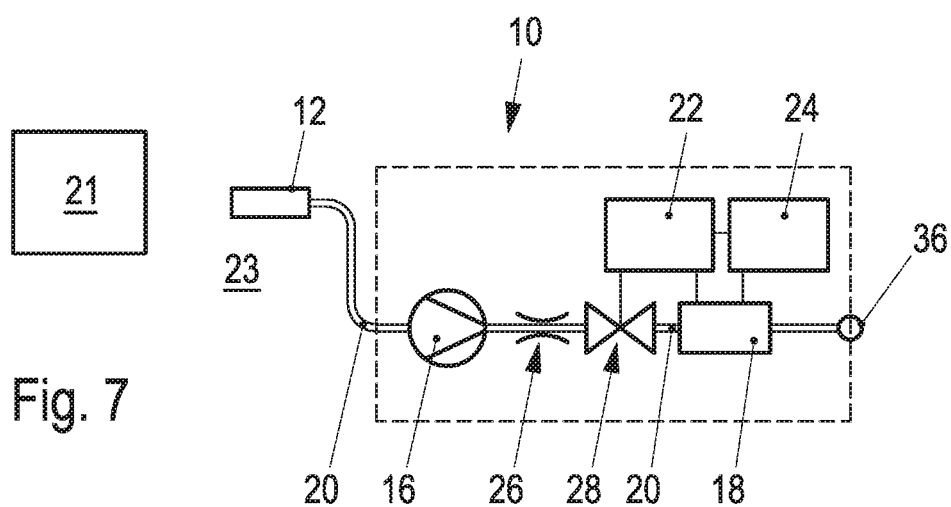
FIG. 7 illustrates a fifth exemplary embodiment.

The exemplary embodiment in FIG. 7 is distinguished from the exemplary embodiment in FIG. 2 in that the gas pump 16 is not arranged between the valve 28 and the sensor 18, but rather, is upstream of the throttle 26, as in the exemplary embodiment in FIG. 6.

Figure 8:
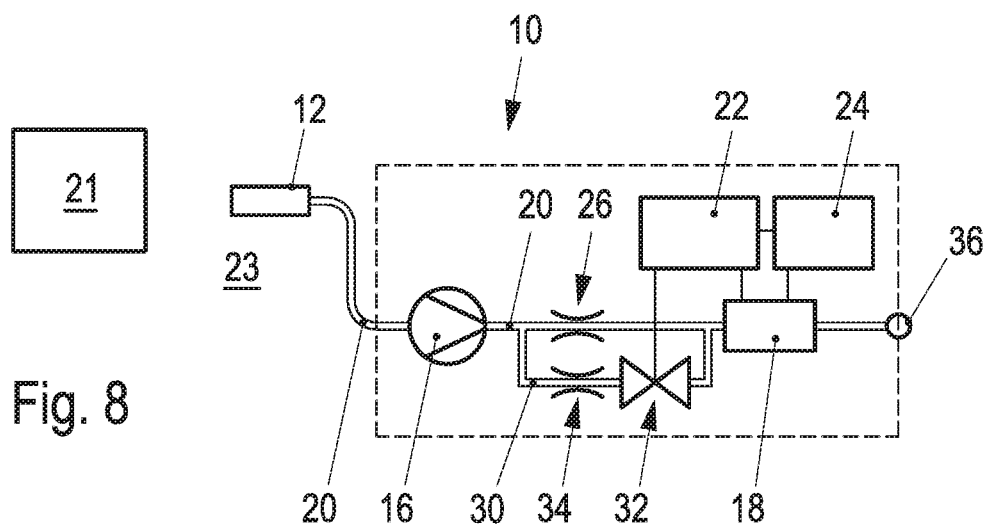
FIG. 8 illustrates a sixth exemplary embodiment.

The same is true of the exemplary embodiment according to FIG. 8, in which the gas pump 16 is not arranged between the parallel circuit of throttle 26 and valve 32 and the sensor 18, but rather in the gas line path 20 upstream of the parallel circuit of throttle 26 and 34.

The invention claimed is:

1. A method for distinguishing a test gas escaping from a leak in a test object from an interfering gas in the environment of the test object during sniffing leak detection, having the steps:

suctioning gas from the environment of the test object in the region of the outer surface of the test object by means of a sniffing tip, which sniffing tip has a suction opening, which suction opening is connected, for gas conduction, to a sensor, which sensor is designed to determine the test gas partial pressure of the test gas in the suctioned gas flow;

varying, with periodic repetition, the flow intensity of the suctioned gas flow;

setting a total pressure of the suctioned gas at the sensor of at least 80 percent of the total pressure of the gas in the atmosphere surrounding the test object;

avoiding fluctuations of the total pressure of the suctioned gas at the sensor of more than 10 percent;

measuring the test gas partial pressure of test gas contained in the suctioned gas flow by means of the sensor; and indicating that the test object has a leak if the measured test gas partial pressure has a varying component, the mean amplitude of which is greater than a threshold value and which follows the variation of the suctioned gas flow.

2. The method according to claim 1, characterized in that an indication is provided that there is no leak if the measured test gas component does not have a component exceeding the threshold value.

3. The method according to claim 1, characterized in that the varying, periodically repeated, of the flow intensity of the suctioned gas occurs in the form of a modulation with a modulation frequency in the range of 1 Hz to 20 Hz.

4. The method according to claim 1, characterized in that the total pressure of the suctioned gas flow at the sensor is set to a value in the range between 90 percent and 110 percent of the total pressure in the test object atmosphere.

5. The method according to claim 1, characterized in that modulated flow intensity signal of the suctioned gas flow is demodulated according to the principle of a lock-in amplifier with a defined frequency reference and phase reference for modulating the suctioned gas flow.

6. The method according to claim 1, characterized in that in addition there is a comparison measurement of the test gas partial pressure without varying the flow intensity of the suctioned gas flow for comparison purposes.

7. The method according to claim 1, characterized in that the total pressure in the atmosphere surrounding the test object in the region of the sniffer is atmospheric pressure in the range of approx. 900 mbar to approx. 1100 mbar.

8. A sniffing leak detector having:
   a sniffer having a suction opening;
   a gas pump;
   a sensor determining the test gas partial pressure of the test gas to be detected;
   a gas line path connecting the suction opening, the sensor, and the gas pump;
   a control device designed to repeatedly vary the flow intensity of the suctioned gas flow, to set the total pressure of the suctioned gas flow at the sensor to at least about 80 percent of the total pressure of the gas in the atmosphere surrounding the test object, and to avoid fluctuations in the total pressure of the gas at the sensor of more than 10 percent; and,
   an evaluation device designed to determine whether the test gas partial pressure of test gas contained in the suctioned gas flow has a varying component, the mean amplitude of which is greater than a threshold value and which follows the variation of the suctioned gas flow.

9. The sniffing leak detector according to claim 8, characterized in that the sensor is arranged downstream of the gas pump.

10. The sniffing leak detector according to claim 8, characterized in that the gas line path has a throttle between suction opening and sensor.

11. The sniffing leak detector according to claim 10, characterized in that the throttle is a capillary tube having a length in the range of approx. 2 cm to approx. 100 cm and having a diameter of a maximum of approx. 5 mm.

\* \* \* \* \*